(12) United States Patent
Garcia-Ortiz

(10) Patent No.: US 6,392,704 B1
(45) Date of Patent: May 21, 2002

(54) COMPACT VIDEO PROCESSING SYSTEM FOR REMOTE SENSING APPLICATIONS

(75) Inventor: Asdrubal Garcia-Ortiz, Chesterfield, MO (US)

(73) Assignee: Esco Electronics Corporation, St. Louis, MO (US)

( * ) Notice: Subject to any disclaimer, the term of this patent is extended or adjusted under 35 U.S.C. 154(b) by 0 days.

(21) Appl. No.: 08/965,942

(22) Filed: Nov. 7, 1997

(51) Int. Cl.[7] .......................... H04N 7/18; H04N 5/225
(52) U.S. Cl. ................... 348/373; 340/937; 348/149; 348/151; 348/213; 348/374; 396/427; D16/203
(58) Field of Search .................. D16/200, 202, D16/203, 208, 214, 215; 348/143, 148, 149, 151, 152, 207, 211–214, 222, 373, 375; 396/419, 427, 428; 340/933, 937, 942; H04N 5/225, 5/232, 7/18

(56) References Cited

U.S. PATENT DOCUMENTS

| | | | | |
|---|---|---|---|---|
| 3,715,491 A | * | 2/1973 | Finch | 348/243 |
| 4,984,089 A | * | 1/1991 | Stiepel | 348/143 |
| 5,282,182 A | * | 1/1994 | Kreuzer | 348/148 |
| 5,394,208 A | * | 2/1995 | Campbell | 396/429 |
| D381,997 S | * | 8/1997 | Morooka | D16/202 |
| 5,802,281 A | * | 9/1998 | Clapp | 709/228 |
| 5,839,284 A | * | 11/1998 | Wyatt | 62/3.2 |
| 5,852,754 A | * | 12/1998 | Schneider | 348/143 |
| 5,864,365 A | * | 1/1999 | Sramek | 348/373 |
| 5,886,738 A | * | 3/1999 | Hollenbeck | 348/151 |
| 5,966,176 A | * | 10/1999 | Chow | 348/373 |

\* cited by examiner

*Primary Examiner*—Wendy R. Garber
*Assistant Examiner*—Ngoc-Yen Vu
(74) *Attorney, Agent, or Firm*—Polster, Lieder, Woodruff & Lucchesi, L.C.

(57) ABSTRACT

A sensing and processing unit (10) installed on an elevated structure (T) adjacent a roadway (R). An enclosure (12) is mounted on the structure. Housed in the enclosure is a television camera (22, 24), the camera being mounted at an angle less than the plane of the horizontal axis of the enclosure. A processor (42) is also housed in the enclosure and is operatively connected to the camera to process video images acquired by the camera. A digital data storage device (44, 46) is also installed in the enclosure for storing information relevant to a monitoring activity. A communications device (50) installed inside said enclosure sends data to and receives instructions from a monitoring site. The single enclosure facilitates remote site monitoring using a minimum of equipment and simplifies both installation and maintenance requirements.

26 Claims, 4 Drawing Sheets

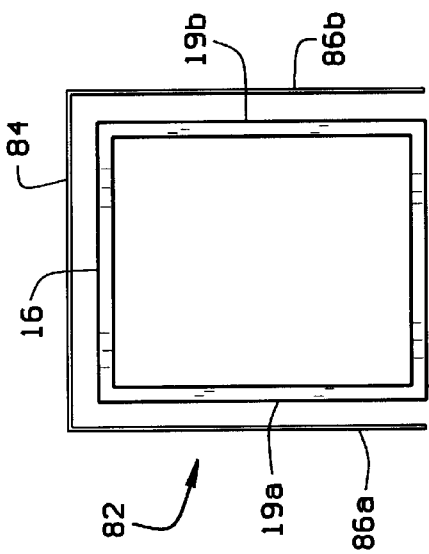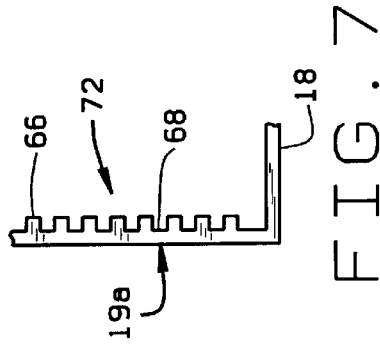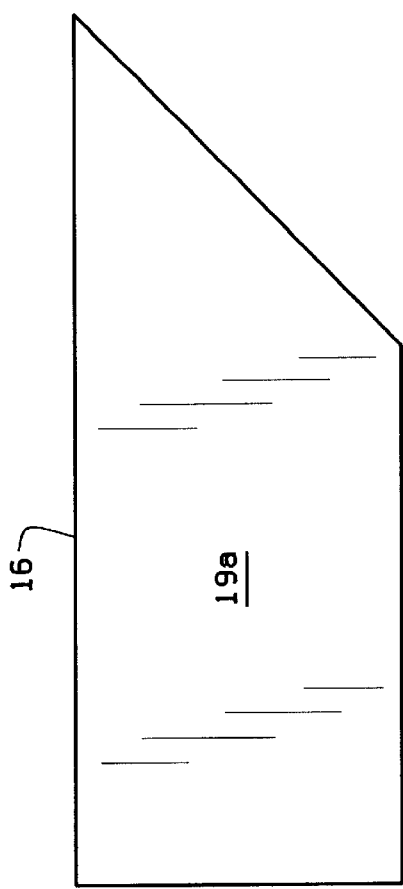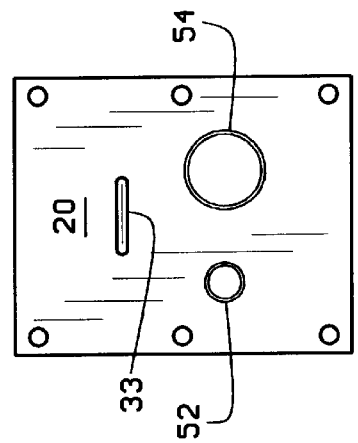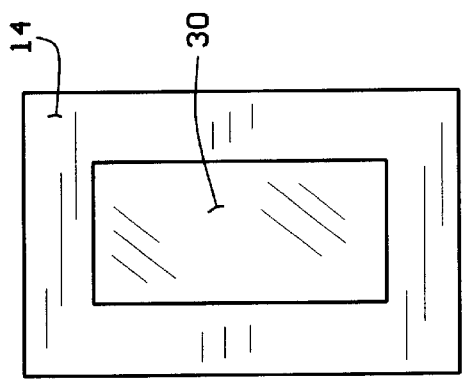

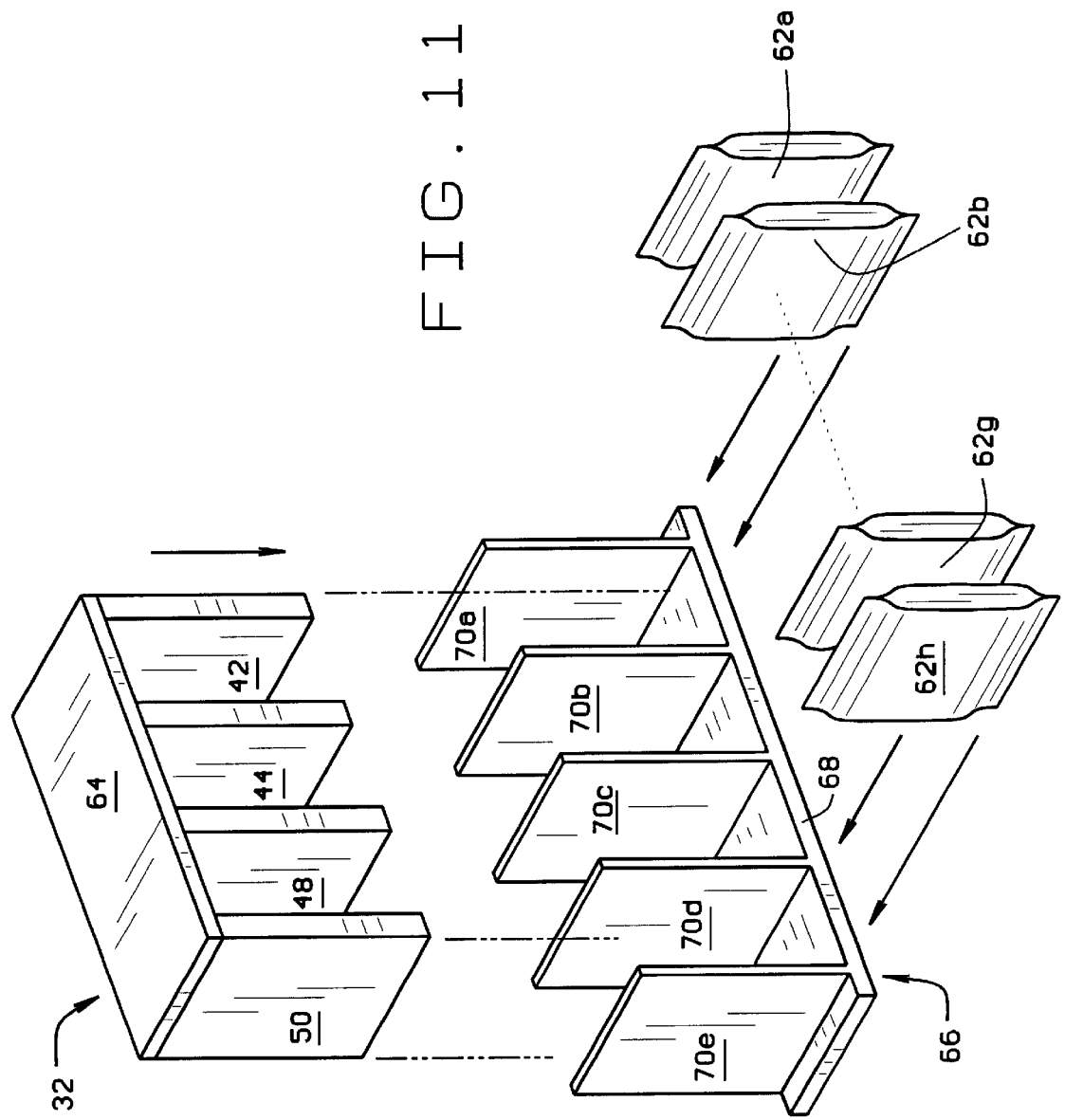

COMPACT VIDEO PROCESSING SYSTEM FOR REMOTE SENSING APPLICATIONS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to systems having a remote sensing capability; and, more particularly, to a self-contained, compact, housing for both a sensor and processing electronics used with the sensor for sensor signals to be processed at the sensor location so as to more reliably obtain sensor information. The system is usable in such applications as monitoring traffic flow, observing parking lots, and as a remote sensor for security systems where it is desirable to remotely locate an observation platform and where it is further desirable to have all image and other data processing performed at the remote location, so as to minimize communications and maintenance requirements for the system.

Video surveillance and remote sensors connected to data processing equipment are well known in the art. Existing surveillance systems employ a sensor mounted at one location and a separate information processor or data collector located at a second location remote from the sensor. A cable or wire run between the two locations interconnects the sensor and processor together. This arrangement has several problems. First, long cable or wire runs usually result in signals received at the processor having low signal-to-noise (SNR) ratios. This, in turn, degrades the quality of video signals being processed and the quality of the resultant images. Second, maintenance and repair must be separately performed on the sensor and the processor because of the remoteness of the two. Or, if done on both together, the maintenance or repair can require additional personnel and may be cumbersome to perform. Third, any break or interruption in the cable or wire renders the entire system inoperative. Fourth, the information processor or collector is typically positioned at ground level or at an easily accessible location, increasing the risk of theft or vandalism. Fifth, existing housing units or enclosures for image acquisition and data processing equipment often has openings, primarily for air flow through the enclosure, to effect heat transfer away from operating components. These openings often invite insects, vermin, and birds into the housing with undesirable results occurring.

BRIEF SUMMARY OF THE INVENTION

The present invention provides a novel solution to the various problems inherent in remote sensing systems. Particularly, a single, self-contained enclosure houses an image sensor, a central processor and an image processor, and data collection and communications components. The enclosure is durable and resistant to weather, and the power and communication interfaces are sealed to NEMA 4 standards. The enclosure has no openings when assembled, and this prevents birds, rodents, and insects from getting inside the enclosure. The enclosure facilitates a compact arrangement of all the components required for remote sensing; and because of this, problems associated with multiple component systems, and systems having components and subassemblies connected together by cables or wires are negated. Information processed within the unit is transmitted from a remote location where the enclosure is located to a monitoring location by communications hardware also housed within the enclosure. The processed information may be transmitted to a single user, shared by other users on a network, or even posted on an internetwork for public information access.

The communication hardware can receive commands and instructions as well as transmit video images and other data, and the system is configurable from another, distant location, or on site, without having to disassemble the apparatus. The image sensor is mounted in a fixed position, and is not intended to be moved. By fixing the position of both the sensor and the enclosure calculations performed by image sensing and data processing portions of the equipment are greatly simplified so, for example, to detect the presence of an object, its position, speed, direction of movement, etc. Data is storable within the system and is readily retrieved for transmission to another location, if so desired. Or, if communications between the sensor site and monitoring location are disrupted, data is readily stored for later transmittal, recovery, and evaluation when the communication's path has been re-established.

Finally, the system has a variety of applications. In one application, the enclosure is mounted above a highway and with the sensor oriented to look down on a roadway. The sensor then senses the movement of vehicular traffic on the highway and provides pertinent information to a traffic monitoring center. However, those skilled in the art will recognize other applications for the system as well. Regardless of the application, the enclosure in which the system components are installed provides a compact, lightweight housing that is easily transportable and does not require a particularly heavy support in order to be mounted in place at a surveillance site.

In accordance with the invention, briefly stated, a sensing and processing unit for use in remote sensing applications first includes an image sensor. An image processor processes an image output from the sensor. A transmitter to which an output from the processor is supplied, transmits appropriate video images and other pertinent data from a remote location where the unit is installed to a monitoring site. An enclosure removably mounted to a fixture at the installation site sealingly houses the sensor, processor and transmission components of the system in a protected environment. Other objects and features will be readily apparent or pointed out hereinafter.

BRIEF DESCRIPTION OF THE SEVERAL VIEWS OF THE DRAWINGS

FIG. 3 is a side elevational view of an enclosure in which components of the system are housed;

FIG. 4 illustrates installation of a sunshield over the enclosure for cooling purposes;

FIGS. 5 and 6 are respective front and rear elevational views of the enclosure;

FIG. 7 is a partial view, in elevation, of an internal wall construction of the enclosure for installing the components;

Corresponding reference characters indicate corresponding parts throughout the several views of the drawings.

DETAILED DESCRIPTION OF THE INVENTION

Figure 8A:
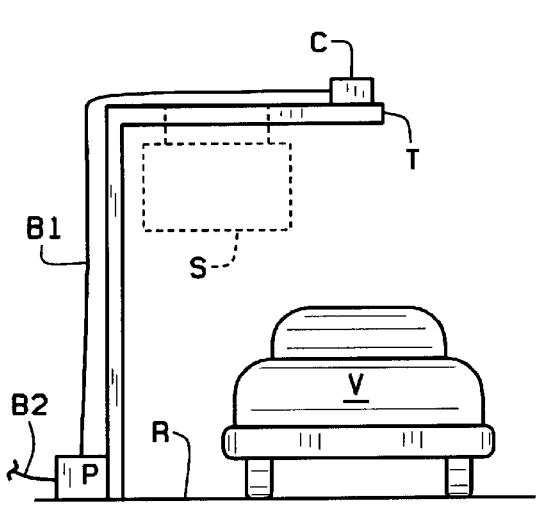
FIG. 8a is a simplified representation of a prior art installation.
Figure 8B:
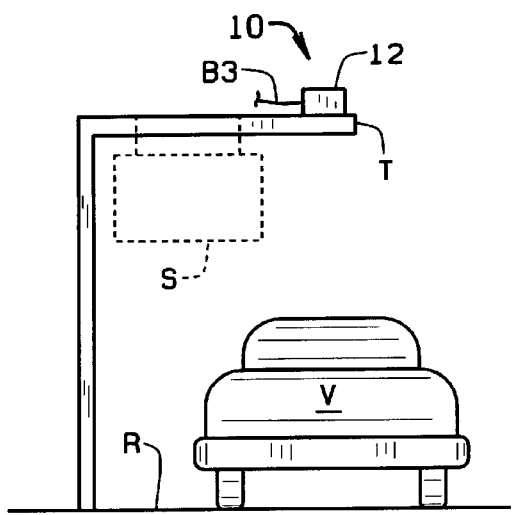
FIG. 8b a simplified representation of an installation of the present invention.

Referring to the drawings, a video sensing and monitoring system is indicated generally 10. As particularly shown in FIG. 2, components of the system are installed and housed in an enclosure 12 which protects the system components from the weather, animals, birds, and insects, and provides adequate cooling and heat transfer for the components so they function properly, have a long service life, and require minimal maintenance. System 10, as housed in enclosure 12, comprises a compact, relatively lightweight, portable system. The size of the enclosure is, for example, 6.5" (16.5 cm.) wide ×7.5" (19.1 cm.) high ×16.0" (40.6 cm.) long, and the weight of the enclosure, with all of the system components installed is approximately 25 lbs. (55 kg.). The compactness of the enclosure, and the self-contained nature of the system facilitates use of the system in various video surveillance and data acquisition applications. An example of one use of the system is shown in FIG. 8b. Here, enclosure 12 is mounted on an existing structure, such as a truss T extending over a roadway R, and supporting a road sign S. Because of the compactness and lightweight of the housing, system 10 is readily installed and supported on the same truss as the sign without the truss having to be reinforced. Further, the enclosure is readily mounted in a convenient location on the truss, generally without having to move or relocate the sign. Once installed, the system can monitor vehicular traffic moving on the roadway beneath the sign. The system can then acquire, process, and transmit data as to the number of passing vehicles V, vehicle speed, vehicle type, etc. The transmitted data is then used for traffic control purposes. In FIG. 8a, a prior art highway monitoring system requires a camera C mounted on the truss. The video output signal from the camera is routed by a cable B1 to a processing unit P typically located at the base of a post supporting the sign. The processing unit includes processing electronics which process the video input and produce output information routed from the site over a cable B2 to a monitoring site. The processing unit, in particular, is subject to theft, damage, and infestation by vermin, insects, and birds. To prevent theft, for example, the processing unit is often secured to the signpost with a chain and lock (not shown). Because of its compact, single enclosure construction, system 10 avoids these problems while still providing all of the site information for which it was installed.

Enclosure 12 has a removable, beveled front plate 14 which is positioned at an angle with respect to an upper enclosure wall surface 16 and lower enclosure wall surface 18. This angle is, for example, approximately 45° and plate 14 angles downwardly and inwardly from upper wall surface 16 to lower wall surface 18. The enclosure further includes sidewalls 19a, 19b. The main body of the enclosure (including the upper and lower wall surfaces) forms a hollow, generally rectangular (in cross-section) enclosure which is open at both ends. Plate 14 completely covers the front end of the enclosure. The portion of the assembly which is installed within the enclosure includes a back plate 20 which completely covers the rear of the enclosure when this portion of the assembly is installed. Although not shown, a circumferential seal extends about the inner face of this rear plate and the wall surface extending about the rear of the enclosure includes a mating groove in which the seal fits when everything is assembled together. In its assembled condition, enclosure 12, with front plate 14 and back plate 20 in place, is sealed to prevent moisture, vermin, insects, etc., from entering into the interior of the enclosure where video sensing and data processing components of system 10 are housed.

Figure 1:
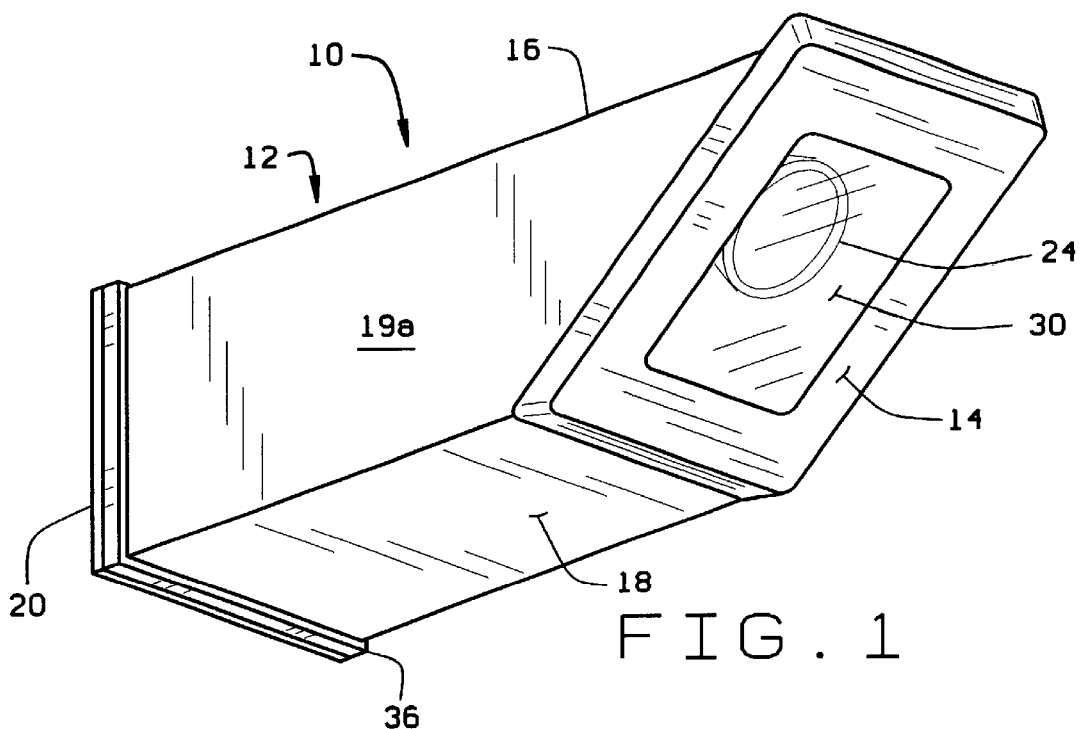
FIG. 1 is a perspective view of a video sensing and processing system of the present invention.
Figure 2:
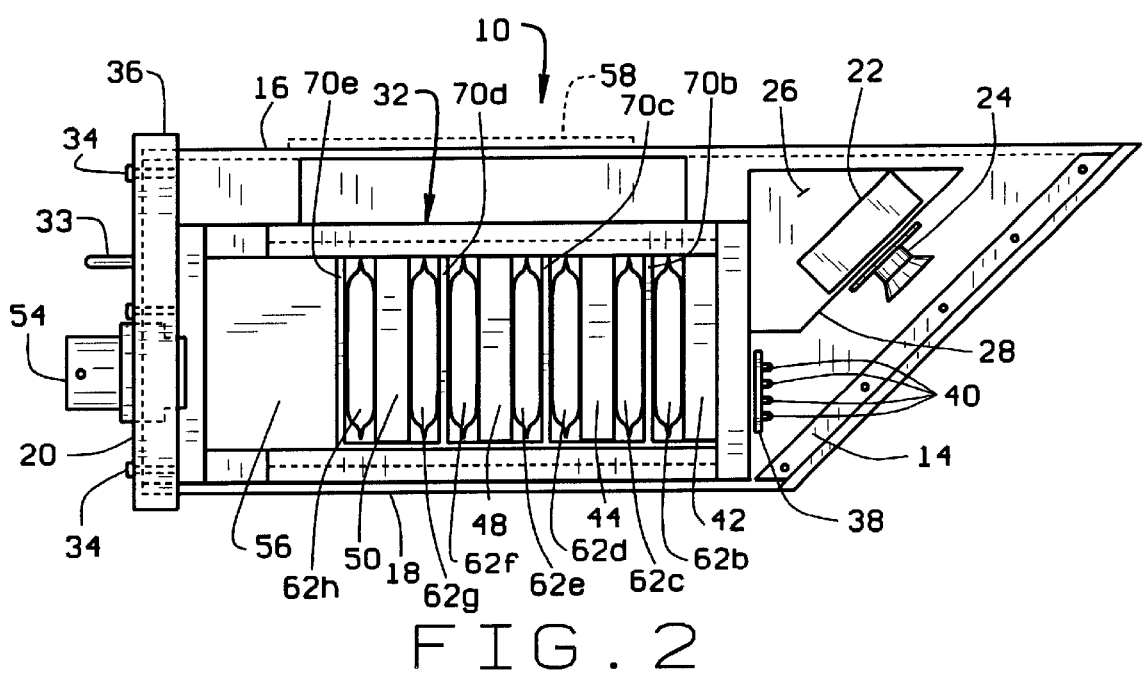
FIG. 2 is a sectional view of the enclosure illustrating installation of the components within the enclosure.

Referring to FIG. 2, video sensing and processing system 10 includes a charged coupled device 22 operatively connected to a camera lens 24. The camera lens is secured in place by a mount 26 which has an angled mounting face 28 also set at 45° so the camera angle corresponds to that of the front plate. Mount 26 holds lens 24 in a fixed position at this angle. As shown in FIGS. 1 and 5, front end plate 14 has a window 30 comprising a clear glass panel. When the front panel 14 is installed, window 30 is in front of lens 24 allowing the camera a clear view of roadway R, for example. Camera lens 24 is also mounted in close proximity to the glass panel to minimize internal reflections. Because of the overhang provided by upper wall surface 16 of enclosure 12, moisture, whether as rain, sleet, or snow, does not readily come into contact with window 30. By directing the moisture away from the window, it will not collect on the window and block visibility through the lens.

Video sensing and processing system 10 next includes a component carriage indicated generally 32 and removably installed in enclosure 12. Back plate 20 is integrally formed with the carriage so the carriage is removable from the enclosure when back plate 20 is moved. A handle 33 is attached to the outer face of the back plate to facilitate handling of the component carriage assembly. The back plate is secured to of enclosure 12 by, for example, screws 34 which are inserted through holes in a circumferentially extending flange of the 36 of the component carriage. The screws are received in threaded openings in the sidewalls of the enclosure.

Carriage 32 houses all of the components of the image and data processing portion of system 10. A LED status panel 38 is connected to the front of the carriage, and when the carriage is installed in the enclosure, the panel is visible through window 30. The status panel provides a visual display of the operational status of the system. In the event of a malfunction or failure, an illuminated lamp 40 on the panel provides a visual indication of the malfunction or failure as well as where in the system a failure has occurred. A central processing unit (CPU) 42 is incorporated on a first printed circuit (PC) board mounted in the carriage. The CPU, which controls data acquisition and utilization of peripheral components, is, for example, an Intel 486DX processor. A storage device controller 44, incorporated on a second PC board mounted in the carriage, uses a standard IDE interface, and interfaces with a storage device 46 also incorporated in this PC board. The storage device stores data in a semi-permanent form; for example, as magnetic particles in a hard disk drive which is a standard PC-card hard disk drive with a formatted capacity of 100–170 megabytes. Alternatively, the storage device is a solid state disk drive.

Communications between video sensing and processing system 10 and a monitoring site is by a communications device 48 which is incorporated on another PC board mounted on carriage 12. In the preferred embodiment, device 48 is a high speed modem capable of transmitting and receiving data over unmodified telephone wires at speeds of 33.6 Kilobits per second (Kbps). Alternatively, device 48 comprises a network interface card (NIC), utilizing a topology such as Ethernet 10baseT, 100baseTX, or a wireless public or private communications network; and, for example, carrying data over a special, dedicated thin twisted pair cable (B3 in FIG. 8b). Regardless, communications between the system and a monitoring site is important, so an operator at the monitoring site can view collected data; and, using appropriate commands, configure the system. Communications to a monitoring site also has the virtue of making the data from the video sensing and processing system available to the public, through an Internet gateway, if so desired.

Power for the system is distributed through a power distribution module 50, which is also a PC board mounted on the carriage. Central processor 42, hard disk controller 44, communication device 48 and power distribution module 50 are all implemented by standard PC/104 printed circuit cards. The cards are both compact and stackable (see FIGS. 2, 10, and 11), and their use enables the overall system to be relatively small. In one embodiment of the invention, electrical power is supplied externally to the system from an external 110 VAC power line. An electrical wire (not shown) conducting the power is attached to a power connector 52 on back plate 20 of the enclosure. In addition to the power connector, a signal connector 54 is also fitted on the back plate. Both connectors are sealed to NEMA 4 and ANSI C80.6 standards for electrical cable connections. Both connectors 52 and 54 are conventional electrical and signal cable connectors, respectively.

Within enclosure 12, a power supply 56 converts the 110 VAC to a DC voltage compatible with the various electronic components comprising the respective system elements. Power supply 56 is, for example, a 65 watt power supply which preferably to operates to provide ±5 volts and +12 volts of direct current power to the components. While these voltage levels are sufficient to operate system 10, power supply 56 efficiently generates these power levels without, at the same time, generating as much heat as a other power supplies would. Alternatively, electrical power is supplied externally, for example, from a solar panel 58 indicated in phantom in FIG. 2, or by a rechargeable battery (not shown).

The lower heat production of power supply 56 is important since enclosure 12 is a sealed unit. Heat generated both by the power supply and the system 10 components is therefore trapped within the enclosure and must be quickly and efficiently directed away from the components so as not to shorten their useful life. With respect to power supply 56, it is directly mounted to back plate 20. This allows the back plate to act as a heat sink for the power supply, facilitating conduction of heat from the power supply, through the back plate, to the atmosphere.

Figure 9:
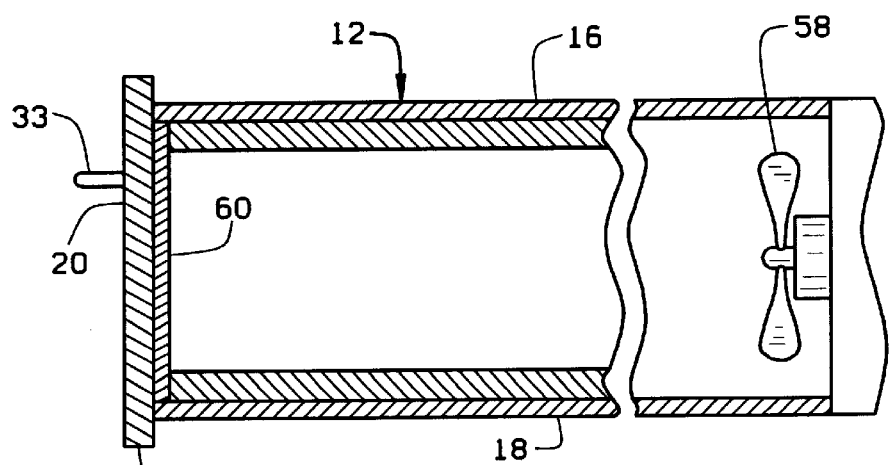
FIG. 9 is a sectional view of the enclosure illustrating a fan/heat sink combination for cooling components of the system.
Figure 10:
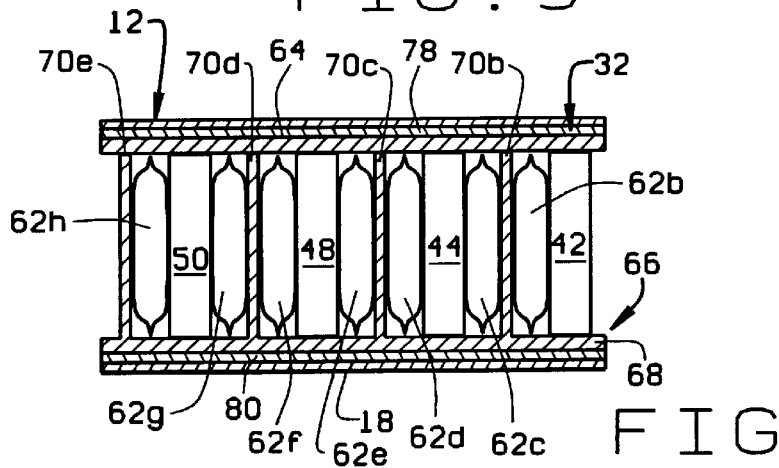
FIG. 10 is top plan view of a carriage on which printed circuit boards are mounted and illustrating cooling pouches used to convey heat away from the system components; and, FIG. 11 is a perspective view of the printed circuit board and cooling assembly installed within the enclosure.

Cooling of the other system 10 components housed within enclosure 12 is accomplished in one of several ways. As shown in FIG. 9, a fan 58 is installed within enclosure 12 and powered by power supply 56. A heat sink 60 mounted on back plate 20 allows the heat in the air drawn through the enclosure by the fan to be conducted to the atmosphere via the heat sink. Alternatively, and as best shown in FIGS. 10 and 1, fluid filled liquid heat sink elements 62 are nested between and the component cards 42, 44, 48 and 50 when the cards are mounted in place. The heat sink elements comprise pouches formed of a multi-layer film filled with a Perfluorocarbon such as Fluorinert® available from the Minnesota Mining & Manufacturing Company (3M), and the heat sink elements are commercially available from Aavid Thermal Technologies, Inc.

As shown in FIGS. 10 and 11, component carriage 32 has a bus bar 64 extending the length of the carriage across the top thereof. The bus bar includes connectors (not shown) by which the PC cards are edge mounted to the carriage. In addition to power, various other signals are routed through the bus bar. The edge mounted PC card subassembly is now fitted into a rack 66 comprising a base 68 and a plurality of spaced panels 70a–70e which extend upwardly from the base. As shown in FIG. 10, the PC cards interfit with the panels in an interdigitated manner with the PC cards centered between adjacent panels. Liquid heat sink elements 62a–62h are next inserted into the space between each side of a card and the adjacent panel 70.

To further aid in heat dissipation, and as shown in FIG. 7, the interior sidewall surface 72 is formed with a series of alternating ridges 74 and grooves 76, these ridges and grooves running lengthwise of enclosure 12. These ridges and grooves serve two purposes. First they serve as guides for installing and removing carriage 32 into and from enclosure 12. Second, the ridges and grooves substantially increase the surface area of the interior sidewall of the enclosure, thus allowing for greater convective heat transfer than would be achievable if this interior wall surface were smooth. The smooth interior wall surfaces, on the other hand, facilitate conductive heat transfer from the system components to the outside of the enclosure by use of pliable thermal interface components 78 and 80 as shown in FIG. 10. The heat generated by the components installed on the respective cards 42, 44, 48, 50 is transferred to the various elements 62 abutting the cards. The heat is conducted to thermal interface components 78, 80 by which the heat is further conducted through the sides of the enclosure to the atmosphere.

As shown in FIG. 4, a sunshield 82 fits over enclosure 12 to shield the enclosure and the video sensing and processing equipment housed therein from direct sunlight, and to dissipate heat from the sun. Sunshield 82 is generally U-shaped when viewed in front or rear elevation, having a top surface 84 and sidewalls 86a, 86b. When installed, the sunshield covers the top and sides of enclosure 12. The sunshield is attached to the enclosure in any convenient manner so there is a space or air gap between the sunshield and housing. This air gap provides a thermal insulation for the components housed in the enclosure.

What has been described is a self-contained enclosure housing an image sensor, processing electronics for processing information supplied by the sensor, and data collection and communications hardware. The enclosure is durable and weather resistant and the power and communication interfaces are sealed to NEMA 4 standards. The enclosure has no openings thus preventing infestation by birds, animals, and insects. Within the enclosure is a compact arrangement of all the equipment utilized in a system. Such an arrangement eliminates the problems of multiple component systems in where various components are remote from one another. Information processed within the unit is transmitted from a remote location where the enclosure is located to a monitoring location by the communications components housed within the enclosure. The transmitted information can be sent to a single user, or sent to multiple sites. The system housed within the enclosure can be remotely reconfigured without having to disassemble the enclosure. The sensor is mounted in a fixed position, and is not intended to be moved.

Importantly, the enclosure is constructed for rapid and efficient heat transfer from the components to the outside of the enclosure. Fans, or other thermal cooling elements are readily installed within the housing to also facilitate this heat transfer. This heat transfer capability is augmented by use of a sunshield as well as power saving components such as the system's power supply which generates less heat than standard components. Finally, the enclosure in which the system components are installed provides a compact, lightweight housing that is easily transportable and does not require a particularly heavy support in order to be mounted in place at a monitored site.

In view of the foregoing, it will be seen that the several objects of the invention are achieved and other advantageous results are obtained.

As various other changes could be made in the above constructions without departing from the scope of the invention, it is intended that all matter contained in the above description or shown in the accompanying drawings shall be interpreted as illustrative and not in a limiting sense.

What is claimed is:

1. A sensing and processing unit for use in remote sensing applications comprising:
   a sensor;
   a processor processing an output from said sensor;
   communication means to which an output from said processor is supplied, said communication means transmitting said processor output from a remote location where said unit is used to monitor a site;
   a sealed enclosure in which is housed printed circuit boards, the enclosure being removably mountable to a mounting fixture and sealingly housing said sensor, processor and communication means in a protected environment; and,
   heat transfer means housed in the enclosure to transfer heat generated by operation of said sensor, processor, and communication means away therefrom and to the atmosphere surrounding said enclosure, said heat transfer means including heat sink elements fitted between the printed circuit boards, said heat sink elements having a surface in heat transfer contact with a wall of said enclosure to transfer heat from components on said printed circuit boards through said wall to the atmosphere outside said enclosure.

2. The remote sensing and processing unit of claim 1 wherein said heat transfer means includes a fan and a heat sink installed in said enclosure, said heat sink being in heat conductive contact with a surface of said enclosure and said fan directing air through said enclosure at said heat sink for said heat sink to conduct heat from said air through said surface to the atmosphere outside said enclosure.

3. The remote sensing and processing unit of claim 1 wherein AC voltage is supplied to said enclosure and the unit includes a power supply converting the AC voltage to a DC voltage used by said components.

4. The remote sensing and processing unit of claim 1 further including a power supply mechanically mounted on a back plate of said enclosure and has a surface in heat transfer contact with said back plate to reduce heat buildup inside said enclosure.

5. The remote sensing and processing unit of claim 1 having a handle attached to said enclosure to facilitate transportation of said unit and to provide a safety cable attachment point during installation of said unit.

6. The remote sensing and processing unit of claim 1 wherein said communication means includes a cable and a connector mounted on a surface of said enclosure for connecting said cable to said communication means to transmit said processor output through said cable.

7. The remote sensing and processing unit of claim 6 wherein said cable is a telephone cable.

8. The remote sensing and processing unit of claim 1 wherein said communication means is via the airwaves.

9. The remote sensing and processing unit of claim 8 wherein said communication is via a cellular communication network.

10. The remote sensing and processing unit of claim 1 further including a carriage removably installed within said enclosure, the printed circuit boards being mounted on said carriage.

11. The remote sensing and processing unit of claim 10 wherein said carriage is mechanically attached to a back plate of said enclosure to ease extraction of said carriage from said enclosure.

12. The remote sensing and processing unit of claim 1 further including a sunshield installed over said enclosure to keep heat from the sun from directly contacting said enclosure and heating the interior of said enclosure.

13. The remote sensing and processing unit of claim 12 wherein said sunshield is installed in a spaced relationship to said enclosure thereby to form an air gap between said enclosure and said sunshield.

14. The remote sensing and processing unit of claim 1 wherein DC voltage is supplied to said enclosure and the unit includes a power supply converting the DC voltage to a DC voltage used by said components.

15. The remote sensing and processing unit of claim 14 wherein said power supply includes solar panels mounted atop said enclosure.

16. The remote sensing and processing unit of claim 1 wherein said sensor is an image sensor.

17. The remote sensing and processing unit of claim 16 wherein said image sensor includes a camera lens.

18. The remote sensing and processing unit of claim 17 wherein said image sensor further includes a mount installed in said enclosure for holding said lens at a fixed angle relative to said enclosure.

19. The remote sensing and processing unit of claim 17 wherein said image sensor is a charge coupled device operatively connected to said lens.

20. The remote sensing and processing unit of 17 wherein said processor includes an image processor for processing video images obtained by said image sensor.

21. The remote sensing and processing unit of claim 20 wherein said processor further includes a data processor.

22. A remote sensing and processing unit comprising:
    an image sensor including a lens and a charged coupled device operatively connected with said lens;
    a processor including a central processing unit and a digital signal processor processing video image signals from said image sensor;
    a data storage device storing digital data;
    a communications unit sending and receiving data from a remote source;
    an enclosure in which said image sensor, processor, and communications unit are housed, said enclosure being a sealed enclosure for protecting the aforesaid components from the weather, dirt, dust and infestation by living creatures, whereby said unit is locatable in a remote location and can perform all necessary monitoring, processing, and communications tasks with only a single piece of equipment, thereby simplifying a monitoring application, components comprising said image sensor, processor, and communications units being installed on printed circuit boards mounted within the sealed enclosure, and, heat transfer means housed in the enclosure to transfer heat generated by the components away therefrom and to the atmosphere surrounding said enclosure, said heat transfer means including heat sink elements fitted between the printed circuit boards, said heat sink elements having a surface in heat transfer contact with a wall of said enclosure to transfer heat from components on said printed circuit boards through said wall to the atmosphere outside said enclosure.

23. The sensing and processing unit of claim 22 further including a power supply for converting external power supplied to said unit to power usable by the components housed within said enclosure.

24. The sensing and processing unit of claim 22 including a power connector and a communications connector installed on a wall of said enclosure for routing power into said enclosure and communications to and from said unit.

25. The sensing and processing unit of claim 22 wherein the storage device is a fixed magnetic disk.

26. A sensing and processing unit for installation on an elevated structure adjacent a roadway comprising:

an enclosure mounted on said elevated structure;

at least one closed circuit television camera positioned within said enclosure, said camera mounted within said enclosure at an angle less than the plane of the horizontal axis of said enclosure;

at least one processor installed inside said enclosure and operatively connected to said camera to process video images acquired by said camera;

a digital data storage device installed inside said enclosure;

a communication device installed inside said enclosure for sending and receiving data from a remote source;

an energy conversion device to supply electric energy to the electrical components inside said enclosure;

components of said processor, digital storage device, communication device, and energy conversion device being installed on printed circuit boards mounted within the enclosure; and, a heat transfer mechanism to remove heat generated by the components away therefrom and to the atmosphere surrounding said enclosure, said heat transfer mechanism including heat sink elements fitted between the printed circuit boards, said heat sink elements having a surface in heat transfer contact with a wall of said enclosure to transfer heat from components on said printed circuit boards through said wall to the atmosphere outside said enclosure.

* * * * *